(12) United States Patent
Suzuki et al.

(10) Patent No.: US 8,359,552 B2
(45) Date of Patent: Jan. 22, 2013

(54) PORTABLE INFORMATION TERMINAL

(75) Inventors: Hiroyuki Suzuki, Yokohama (JP); Tomihisa Kamada, Tokyo (JP); Fumio Kawabata, Saitama (JP)

(73) Assignee: Access Co., Ltd., Tokyo (JP)

( * ) Notice: Subject to any disclaimer, the term of this patent is extended or adjusted under 35 U.S.C. 154(b) by 404 days.

(21) Appl. No.: 12/668,197

(22) PCT Filed: Jul. 8, 2008

(86) PCT No.: PCT/JP2008/001819
§ 371 (c)(1),
(2), (4) Date: Jan. 7, 2010

(87) PCT Pub. No.: WO2009/008161
PCT Pub. Date: Jan. 15, 2009

(65) Prior Publication Data
US 2010/0199179 A1    Aug. 5, 2010

(30) Foreign Application Priority Data
Jul. 11, 2007   (JP) ................................ 2007-182670

(51) Int. Cl.
*G06F 3/14* (2006.01)
*G06F 3/147* (2006.01)

(52) U.S. Cl. ........ 715/864; 345/156; 345/157; 345/173; 715/206; 715/207; 715/702; 715/840; 715/857; 715/860; 715/863; 715/865

(58) Field of Classification Search .................. 715/702, 715/206, 207, 840, 857, 860, 863, 864, 865; 345/156, 157, 173
See application file for complete search history.

(56) References Cited

U.S. PATENT DOCUMENTS
4,698,625 A * 10/1987 McCaskill et al. ............ 345/157
(Continued)

FOREIGN PATENT DOCUMENTS
JP        09138732 A2    5/1997
(Continued)

OTHER PUBLICATIONS

International Preliminary Report on Patentability and Written Opinion received for PCT Patent Application No. PCT/JP2008/001819, mailed on Jan. 21, 2010, 6 pages of document and 7 pages of English Translation (Translation mailed on Feb. 4, 2010).

(Continued)

*Primary Examiner* — Steven B Theriault
(74) *Attorney, Agent, or Firm* — Morrison & Foerster LLP (57) ABSTRACT

A contact position detecting unit 122 detects the position on the touch panel touched by a controlling object. A rendering unit 104 determines the layout of a document file including a link and display the document in the layout thus determined. A link position specifying unit 106 specifies the position of the link in the screen. A detection area setting unit 114 sets an object detection area for determination that the link is selected by the user as a result of contact with the controlling object associated one-to-one with the link, such that the object detection area occupies a range different from that of the link and is spaced apart from an adjacent object detection area by a predefined minimum distance, that the display mode of the link is maintained, and that the object detection area is superposed on the link. A matching unit 130 matches the position on the touch panel touched by the controlling object against the range occupied by the object detection area so as to determine which object detection area is selected.

24 Claims, 10 Drawing Sheets

U.S. PATENT DOCUMENTS

| | | | | |
|---|---|---|---|---|
| 5,119,079 | A * | 6/1992 | Hube et al. | 715/823 |
| 5,565,888 | A * | 10/1996 | Selker | 715/823 |
| 5,579,037 | A * | 11/1996 | Tahara et al. | 345/173 |
| 5,627,567 | A * | 5/1997 | Davidson | 345/173 |
| 5,689,717 | A * | 11/1997 | Pritt | 715/234 |
| 5,731,805 | A * | 3/1998 | Tognazzini et al. | 345/156 |
| 5,757,358 | A * | 5/1998 | Osga | 715/862 |
| 5,784,056 | A * | 7/1998 | Nielsen | 715/856 |
| 5,808,601 | A * | 9/1998 | Leah et al. | 715/856 |
| 5,808,604 | A * | 9/1998 | Robin | 715/862 |
| 5,825,352 | A * | 10/1998 | Bisset et al. | 345/173 |
| 5,956,035 | A * | 9/1999 | Sciammarella et al. | 715/815 |
| 5,986,639 | A * | 11/1999 | Ozawa et al. | 715/856 |
| 5,990,862 | A * | 11/1999 | Lewis | 715/858 |
| 6,018,345 | A * | 1/2000 | Berstis | 715/859 |
| 6,023,701 | A * | 2/2000 | Malik et al. | 1/1 |
| 6,031,531 | A * | 2/2000 | Kimble | 715/862 |
| 6,034,689 | A * | 3/2000 | White et al. | 715/854 |
| 6,046,722 | A * | 4/2000 | McKiel, Jr. | 715/862 |
| 6,067,079 | A * | 5/2000 | Shieh | 345/173 |
| 6,075,537 | A * | 6/2000 | Adapathya et al. | 715/760 |
| 6,154,752 | A * | 11/2000 | Ryan | 715/202 |
| 6,157,379 | A * | 12/2000 | Singh | 715/866 |
| 6,211,874 | B1 * | 4/2001 | Himmel et al. | 715/781 |
| 6,222,541 | B1 * | 4/2001 | Bates et al. | 715/786 |
| 6,259,436 | B1 * | 7/2001 | Moon et al. | 345/173 |
| 6,285,374 | B1 * | 9/2001 | Falcon | 715/856 |
| 6,295,049 | B1 * | 9/2001 | Minner | 715/856 |
| 6,362,840 | B1 * | 3/2002 | Burg et al. | 715/835 |
| 6,374,272 | B2 * | 4/2002 | Bates et al. | 715/207 |
| 6,377,284 | B1 * | 4/2002 | Lentz et al. | 715/764 |
| 6,384,743 | B1 * | 5/2002 | Vanderheiden | 341/21 |
| 6,567,070 | B1 * | 5/2003 | Light et al. | 345/157 |
| 6,580,442 | B1 * | 6/2003 | Singh et al. | 715/840 |
| 6,587,131 | B1 * | 7/2003 | Nakai et al. | 715/857 |
| 6,628,315 | B1 * | 9/2003 | Smith Dawkins et al. | 715/856 |
| 6,642,936 | B1 * | 11/2003 | Engholm et al. | 345/661 |
| 6,643,824 | B1 * | 11/2003 | Bates et al. | 715/205 |
| 6,664,990 | B1 * | 12/2003 | Bates et al. | 715/857 |
| 6,704,034 | B1 * | 3/2004 | Rodriguez et al. | 715/860 |
| 6,727,892 | B1 * | 4/2004 | Murphy | 345/173 |
| 6,774,788 | B1 * | 8/2004 | Balfe | 340/539.13 |
| 6,788,316 | B1 * | 9/2004 | Ma et al. | 715/760 |
| 6,816,176 | B2 * | 11/2004 | Laffey et al. | 715/860 |
| 6,822,664 | B2 * | 11/2004 | Vale | 715/864 |
| 6,848,077 | B1 * | 1/2005 | McBrearty et al. | 715/206 |
| 6,864,878 | B2 * | 3/2005 | Stohrer et al. | 345/156 |
| 6,874,122 | B1 * | 3/2005 | Bates et al. | 715/236 |
| 6,874,126 | B1 * | 3/2005 | Lapidous | 715/711 |
| 6,885,363 | B2 * | 4/2005 | Smith | 345/157 |
| 6,907,581 | B2 * | 6/2005 | Noy et al. | 715/863 |
| 7,010,761 | B2 * | 3/2006 | Chatani et al. | 715/861 |
| 7,023,428 | B2 * | 4/2006 | Pihlaja | 345/173 |
| 7,047,503 | B1 * | 5/2006 | Parrish et al. | 715/863 |
| 7,103,852 | B2 * | 9/2006 | Kairis, Jr. | 715/800 |
| 7,158,123 | B2 * | 1/2007 | Myers et al. | 345/173 |
| 7,184,032 | B2 * | 2/2007 | Stohrer et al. | 345/173 |
| 7,305,242 | B2 * | 12/2007 | Zakharia et al. | 455/456.1 |
| 7,327,349 | B2 * | 2/2008 | Robbins et al. | 345/156 |
| 7,437,670 | B2 * | 10/2008 | Day et al. | 715/273 |
| 7,461,346 | B2 * | 12/2008 | Fildebrandt | 715/747 |
| 7,467,349 | B1 * | 12/2008 | Bryar et al. | 715/205 |
| 7,489,306 | B2 * | 2/2009 | Kolmykov-Zotov et al. | 345/173 |
| 7,492,350 | B2 * | 2/2009 | Fabre et al. | 345/156 |
| 7,496,831 | B2 * | 2/2009 | Dutta et al. | 715/207 |
| 7,539,933 | B2 * | 5/2009 | Brown et al. | 715/207 |
| 7,605,804 | B2 * | 10/2009 | Wilson | 345/173 |
| 7,688,315 | B1 * | 3/2010 | Gettemy et al. | 345/174 |
| 7,689,924 | B1 * | 3/2010 | Schneider | 715/764 |
| 7,735,016 | B2 * | 6/2010 | Celik et al. | 715/767 |
| 7,737,958 | B2 * | 6/2010 | Jeon et al. | 345/173 |
| 7,760,187 | B2 * | 7/2010 | Kennedy | 345/173 |
| 7,770,120 | B2 * | 8/2010 | Baudisch | 715/740 |
| 7,843,427 | B2 * | 11/2010 | Ording et al. | 345/157 |
| 7,844,914 | B2 * | 11/2010 | Andre et al. | 715/773 |
| 7,861,187 | B2 * | 12/2010 | Diederiks et al. | 715/860 |
| 7,865,215 | B2 * | 1/2011 | Bells et al. | 455/566 |
| 7,889,184 | B2 * | 2/2011 | Blumenberg et al. | 345/173 |
| 7,889,185 | B2 * | 2/2011 | Blumenberg et al. | 345/173 |
| 7,900,156 | B2 * | 3/2011 | Andre et al. | 715/773 |
| 8,009,146 | B2 * | 8/2011 | Pihlaja | 345/173 |
| 8,013,839 | B2 * | 9/2011 | Ording et al. | 345/157 |
| 8,042,044 | B2 * | 10/2011 | Van Leeuwen | 715/702 |
| 8,063,879 | B2 * | 11/2011 | Moosavi et al. | 345/156 |
| 8,077,153 | B2 * | 12/2011 | Benko et al. | 345/173 |
| 8,108,793 | B2 * | 1/2012 | Nguyen et al. | 715/792 |
| 8,117,532 | B2 * | 2/2012 | Dutta et al. | 715/207 |
| 8,117,565 | B2 * | 2/2012 | Murphy | 715/860 |
| 8,125,441 | B2 * | 2/2012 | Li | 345/156 |
| 2001/0016858 | A1 * | 8/2001 | Bates et al. | 707/513 |
| 2001/0047375 | A1 * | 11/2001 | Fest | 707/526 |
| 2002/0052890 | A1 * | 5/2002 | Ingram et al. | 707/500.1 |
| 2002/0067346 | A1 * | 6/2002 | Mouton | 345/173 |
| 2002/0075333 | A1 * | 6/2002 | Dutta et al. | 345/862 |
| 2002/0178142 | A1 * | 11/2002 | Higashigawa | 707/1 |
| 2003/0063073 | A1 * | 4/2003 | Geaghan et al. | 345/173 |
| 2004/0044747 | A1 * | 3/2004 | Trevor et al. | 709/217 |
| 2004/0133851 | A1 * | 7/2004 | Allan | 715/501.1 |
| 2004/0178994 | A1 * | 9/2004 | Kairls, Jr. | 345/173 |
| 2004/0204128 | A1 * | 10/2004 | Zakharia et al. | 455/566 |
| 2006/0161846 | A1 * | 7/2006 | Van Leeuwen | 715/702 |
| 2006/0161871 | A1 * | 7/2006 | Hotelling et al. | 715/863 |
| 2007/0097096 | A1 * | 5/2007 | Rosenberg | 345/173 |
| 2008/0189629 | A1 * | 8/2008 | Diederiks et al. | 715/762 |
| 2008/0259041 | A1 * | 10/2008 | Blumenberg et al. | 345/173 |
| 2009/0128505 | A1 * | 5/2009 | Partridge et al. | 345/173 |
| 2009/0132902 | A1 * | 5/2009 | Dutta et al. | 715/207 |
| 2010/0060605 | A1 * | 3/2010 | Rimas-Ribikauskas et al. | 345/173 |
| 2010/0085303 | A1 * | 4/2010 | Kwok et al. | 345/157 |
| 2010/0095205 | A1 * | 4/2010 | Kinoshita | 715/702 |
| 2011/0126087 | A1 * | 5/2011 | Aust | 715/206 |
| 2011/0141031 | A1 * | 6/2011 | McCullough et al. | 345/173 |

FOREIGN PATENT DOCUMENTS

| | | |
|---|---|---|
| JP | 2000207089 A2 | 7/2000 |
| JP | 2004118484 A2 | 4/2004 |
| JP | 2004525452 T2 | 8/2004 |
| WO | 02/069193 A1 | 9/2002 |

OTHER PUBLICATIONS

International Search Report received for PCT Patent Application No. PCT/JP2008/001819, mailed on Aug. 12, 2008, 2 pages of document and 1 page of English Translation.

Office Action received for Japanese Patent Application No. 2009-522521, mailed on Oct. 15, 2012, 4 pages (2 pages of English Translation and 2 pages of Office Action).

* cited by examiner

| DETECTION AREA SETTING ID 252 | OCCUPIED DETECTION AREA RANGE IN COORDINATES 254 | ASSOCIATED HYPERLINK 256 | LINK DESTINATION URL 258 |
|---|---|---|---|
| | | | |
| | | | |
| | | | |
| | | | |

PORTABLE INFORMATION TERMINAL

TECHNICAL FIELD

The present invention relates to a technology for displaying a document including a link in a portable information terminal provided with a touch panel.

BACKGROUND ART

Recently, portable information terminals (e.g., cell phones, personal digital assistants (PDA)) provided with a touch panel as a control device are available on the market. Touch panels allow intuitive user operations. Therefore, it is expected that a growing number of portable information terminals provided with a touch panel will be available. The user viewing web contents using a portable information terminal like this will designate a hyperlink displayed in the screen, using a finger or a touch pen (stylus) especially provided for the terminal.

Since the screen size of a portable information terminal is small, however, it could be extremely difficult to select a hyperlink where they are close together. For example, the end of the finger pressing the touch panel may extend over multiple links with the result that an undesired link may be selected. The user may use a stylus having an end narrower than the finger. As the available screen gets smaller, however, the user will experience difficulty with aligning the end with a desired position, resulting in the link being selected by mistake. The difficulty will be particularly acute when the user reads a page designed for a PC instead of a cell phone.

Technologies are devised to prevent hyperlinks from being close together in order to reduce the likelihood of a link being selected by mistake. For example, patent document No. 1 discloses a technology for drafting a document in which the position of display of a hyperlink in a document file is changed by inserting a blank around the hyperlink. Further, patent document No. 2 discloses a method of reformatting a web page by inserting HTML tags or by using a cascade style sheet, when the hyperlinks in the web page are close together.
[patent document No. 1] JP 2004-118484
[patent document No. 2] JP 2004-525452

DISCLOSURE OF THE INVENTION

Problem to be Solved by the Invention

However, according to patent document No. 1, the congestion of links is removed by inserting line breaks and spaces in an HTML file, the screen layout intended by the creator of the HTML is disrupted. According to patent document No. 2, the screen layout is allowed to remain relatively unchanged but the display mode of the link is changed from the original. Both of the technologies keep intact a vertical array of multiple hyperlinks, which are normally character strings aligned in the horizontal direction, in the screen. Thus, the ease of selecting a link using a touch panel is not improved so much when a page contains a large number of hyperlinks.

The present invention addresses the problem and a purpose thereof is to provide a technology to improve the ease of selecting a link in a terminal provided with a touch panel, without changing the display mode of the document file including the link.

Means to Solve the Problem

One embodiment of the present invention relates to a portable information terminal. The terminal comprises: a touch panel provided over a display; a contact position detecting unit adapted to detect the position on the touch panel touched by a controlling object; a rendering unit adapted to determine the layout of a document file including a link and display the document in the layout thus determined; a link position specifying unit adapted to specify the position of the link in the screen; a detection area setting unit adapted to set an object detection area for determination that the link is selected by the user as a result of contact with the controlling object associated one-to-one with the link, such that the object detection area occupies a range different from that of the link and is spaced apart from an adjacent object detection area by a predefined minimum distance, that the display mode of the link is maintained, and that the object detection area is superposed on the link; a matching unit adapted to match the position on the touch panel touched by the controlling object against the range occupied by the object detection area so as to determine which object detection area is selected; and an access executing unit adapted to access a resource identified by the link associated with the selected object detection area.

The term "document file" encompasses an ordinary text file, an HTML file or an XML file described in a markup language, a mail file, a cache, and a temporary file. A mail file could correspond to a single mail message. Alternatively, a single file may be provided for all mail messages stored in a folder (e.g., a reception folder of a mail program). A document file may be acquired via a network or stored in a storage device of a terminal provided with a link generation device. The term "link" refers to information embedded in a document file to access an object such as another document or image. A link could be a hyperlink included in a hypertext, or anything (shortcut, alias, icon, button, etc.) that prompts the start of an associated process when the user touches a specified area therein as displayed in the screen with a controlling object. The term "controlling object" refers to anything used to press the touch panel. For example, the object could be the user's finger used for selection via the touch panel, or a stylus, which often comes with a portable information terminal. A touch panel could also be a pen tablet.

According to the embodiment, the ease of selecting a link is improved without changing the layout of the document file including the link, by displaying an object detection, occupying a range different from that of the link, such that the area is spaced apart from an adjacent object detection area by a minimum distance and is superposed on the link when displayed.

The detection area setting unit may define the minimum distance so that simultaneous selection of object detection areas by the controlling object is avoided. This prevents an adjacent link from being recognized in error.

The detection area setting unit may set the object detection area without modifying the document file.
This prevents the document file from being modified from the original state.

The terminal may further comprise: a display output unit adapted to render the object detection area in a mode visible to the user. This lets the user know which part on the touch panel should be selected to select the link.

The contact position detecting unit may include an approach detecting unit adapted to detect an approach of the controlling object to the touch panel. The display output unit may not render the object detection area initially, and render the object detection area when the approach detecting unit detects the approach of the controlling object. This allows the user to continue to view the document file in the original display format unless the user performs the operation of selecting the link using the controlling object.

The contact position detecting unit may include an approach detecting unit adapted to detect an approach of the controlling object to the touch panel. The display output unit may change the display mode of the object detection area when the approach detecting unit detects the approach of the controlling object. This lets the user know which object detection area is recognized as being selected and prevents the user from applying pressure by mistake.

The terminal may further comprise a proximity calculating unit adapted to calculate proximity between links placed by the rendering unit in the screen. The detection area setting unit may set the object detection area in association with the link when the proximity is smaller than a predefined value for determination that the links are close together in the screen. In this way, it is ensured that an object detection area is not set when it is unlikely that the link is selected by mistake, e.g., when the links are spaced apart from each other. This will consequently eliminate unnecessary processes and reduce the computing load.

The matching unit may disregard the contact of the controlling object with the touch panel in a part of the link not overlapping the object detection area. This ensures that adjacent object detection areas are spaced apart from each other.

The terminal may further comprise an arrangement adjusting unit adapted to adjust the arrangement of object detection areas so that the distance between the object detection areas is optimized according to a certain criterion on the condition that at least a part of each object detection area overlaps the associated link This prevents adjacent detection areas from being close together and further reduces the likelihood of selecting the link by mistake.

The detection area setting unit may set the size of each object detection area according to the size occupied by the outer edges of the character string of the link associated with the object detection area.

The display output unit may render adjacent object detection areas in different display modes. The display output unit may change the display mode of the object detection area according to the distance from an adjacent object detection area. This further facilitates visual distinction between object detection areas so that it is expected that the link is less likely to be selected by mistake.

The detection area setting unit may set a substantially circular object detection area. In a majority of web pages, a link includes multiple characters aligned in the horizontal direction. Ensuring that the object detection area is substantially circular allows the distance to an objection detection area above or below to be secured by appropriately moving the circle in the horizontal direction with respect to the link.

Optional combinations of the aforementioned constituting elements, and implementations of the invention in the form of methods, apparatuses, systems, recording mediums and computer programs may also be practiced as additional modes of the present invention.

ADVANTAGE OF THE PRESENT INVENTION

According to the present invention, the ease of selecting a link in a terminal provided with a touch panel is improved without changing the layout of the document file including the link.

DESCRIPTION OF THE REFERENCE NUMERALS 10 portable information terminal, 12 server, 14 network, 36 display, 50 touch panel, 102 document retrieving unit, 104 rendering unit, 106 link position specifying unit, 110 detection area arranging unit, 112 proximity calculating unit, 114 detection area setting unit, 116 arrangement adjusting unit, 120 display output unit, 122 contact position detecting unit, 124 approach detecting unit, 130 matching unit, 132 access executing unit

BEST MODE FOR CARRYING OUT THE INVENTION

One embodiment of the present invention provides a function adapted for a portable information terminal having a browser installed and allowing a user to view a web page, and capable of rendering a special on-screen feature that facilitates the selection of a link in the web page using a finger or a stylus. In this embodiment, the special on-screen feature will be referred to as "object detection area". A general explanation of the portable information terminal will be given first, followed by a detailed explanation of the function according to the embodiment.

Figure 1:
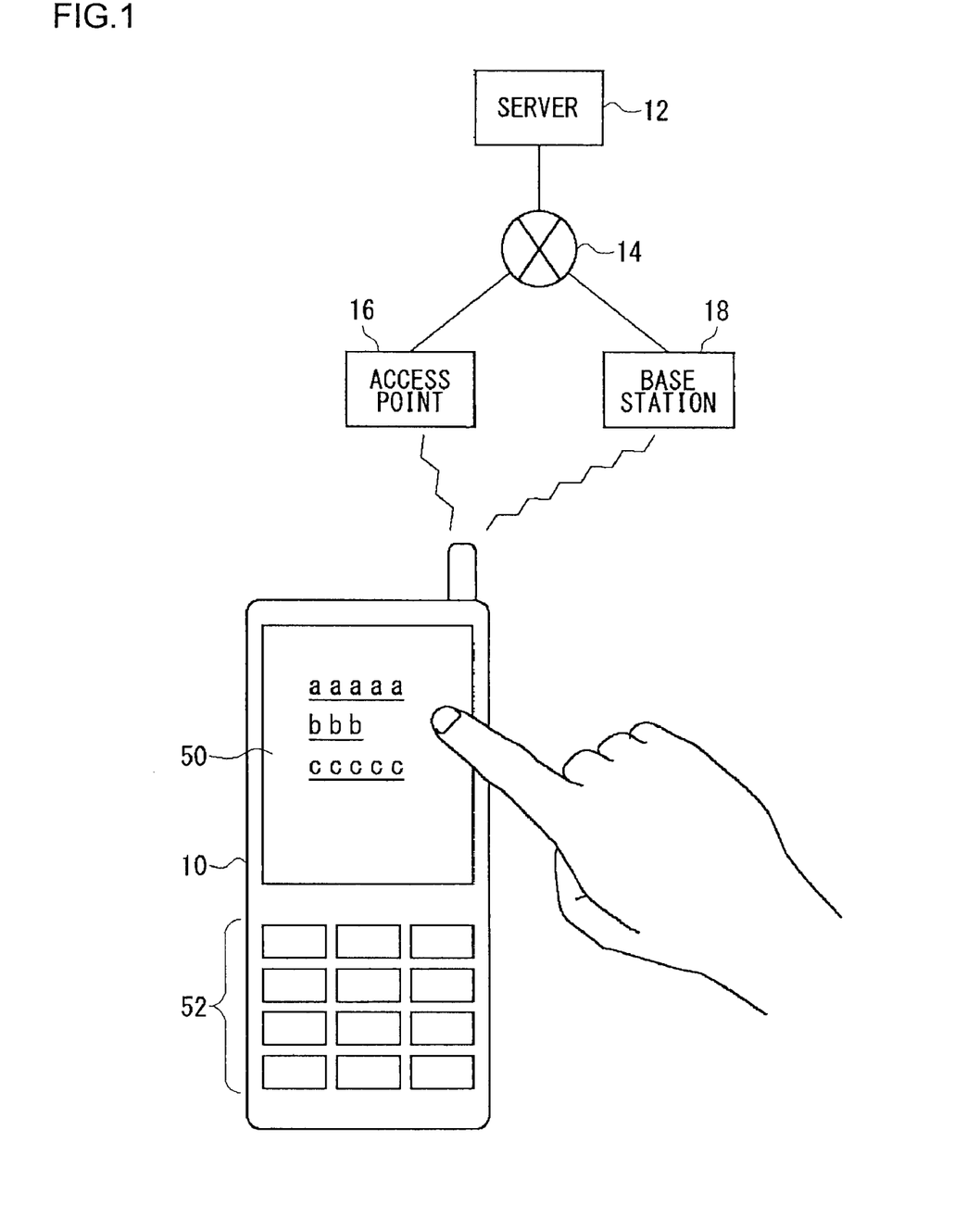
FIG. 1 shows the overall configuration of a network system including a portable information terminal provided with an object detection area display function according to one embodiment of the present invention.

FIG. 1 shows the overall configuration of a network system including a portable information terminal 10 provided with an object detection area display function according to the embodiment.

The portable information terminal 10 may be any hardware movable with the user, such as a laptop PC (personal computer), PDA, cellular phone, and car navigation device provided with communication functions. The portable information terminal 10 is controlled by the user operation and connected to a network 14, such as a LAN and the Internet, via an access point 16 or a base station 18, and is capable of accessing a server 12 identified by a URL and of retrieving desired data.

The server 12 provides the portable information terminal 10 with data such as text data, image data, audio data, video data, etc. via the network 14. The server may be a service entity on the Internet such as a web server. In that case, the invention may be implemented in various modes including: a mode embodied, for example, by a Common Gateway Interface (CGI) in which the server side takes care of the major processing functions; a mode embodied by, for example, a Java (registered trademark) applet in which the major processing functions are shifted to the client side; and a mode embodied by, for example, a Java (registered trademark) application in which the major processing functions are located on both the server side and the client side.

The portable information terminal 10 is configured to refer to and edit a file stored in an internal storage or a storage medium by the user operation, without accessing the network 14.

The portable information terminal 10 is provided with a touch panel 50 superposed on a display. The portable information terminal 10 is mainly controlled by touching the touch panel with a finger of the user or using a tool such as a stylus. Hereinafter, anything that is used to control the touch panel will be referred to as "controlling object". In addition to the touch panel, a pointing device or keys 52 may be provided in the portable information terminal 10.

As the controlling object such as the user finger or the stylus touches the touch panel, the touch panel 50 outputs the coordinates of the position of contact. To produce the touch panel 50, any of the following systems may be employed: a resistive film system in which the potential at the point of contact between a film electrode and a glass electrode is detected so as to calculate the position of contact; an infrared system in which a grid is formed by infrared light emitting devices and photosensitive devices so as to output the position shielded by the controlling object; a supersonic wave system that detects the time of arrival of surface elastic waves and outputs the position of contact; and other well-known methods and any of methods that might be developed in the future.

A well-known browser is installed in the portable information terminal 10. The browser is provided with the function of retrieving a web page from the server 12 according to the HTTP protocol, analyzing document data described in HTML, etc., producing the layout of a web page, and displaying the web page in the layout thus produced on the display.

Figure 2:
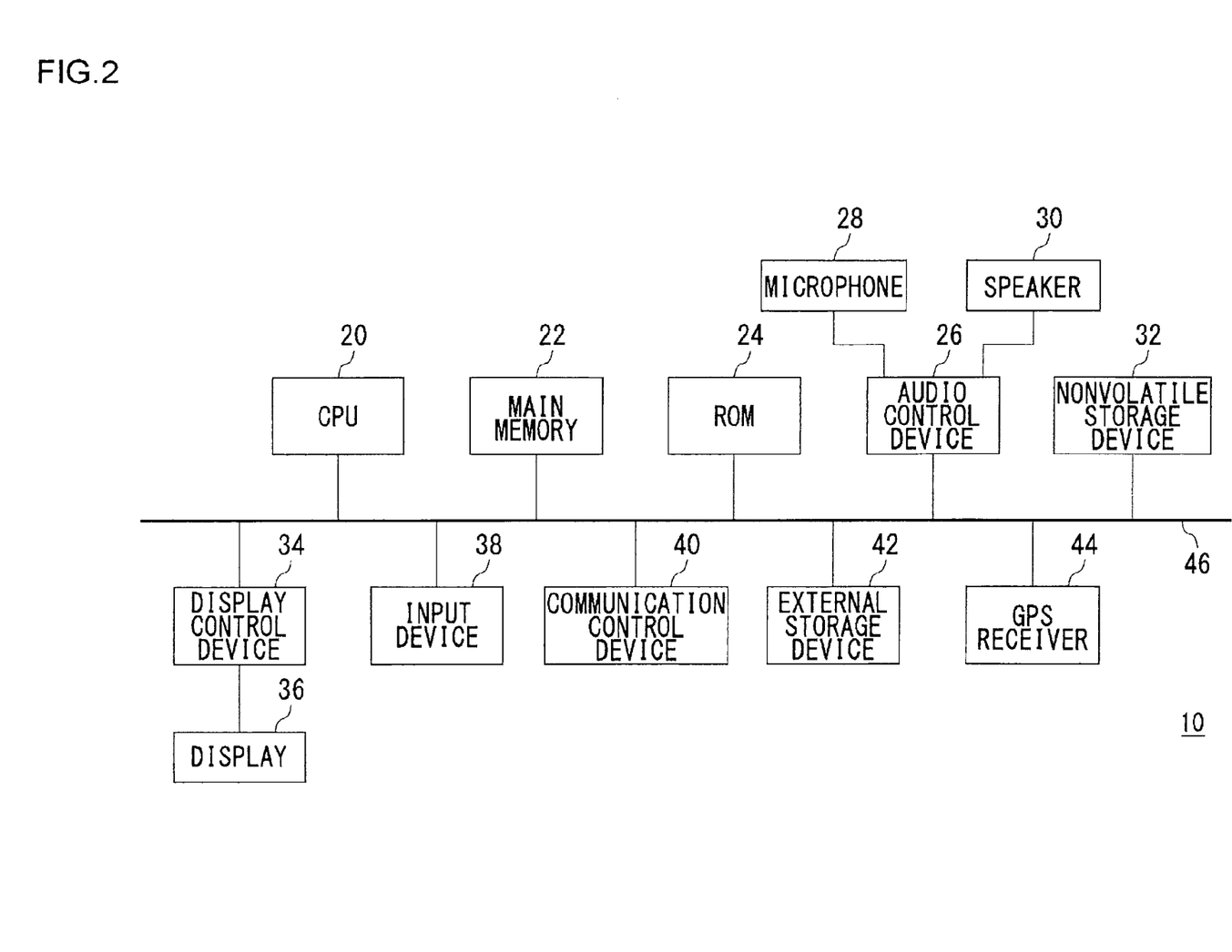
FIG. 2 is a hardware block diagram of the mobile information terminal.

FIG. 2 is a hardware block diagram of the mobile information terminal 10. The mobile information terminal 10 includes a Central Processing Unit (CPU) 20, a main memory (RAM: Random Access Memory) 22, a Read Only Memory (ROM) 24, an audio control device 26, a nonvolatile storage device 32, a display control device 34, an input device 38, a communication control device 40, an external storage device 42, and a GPS receiver 44. These devices are connected to each other through a bus 46.

The CPU 20 controls the entirety of the mobile information terminal 10 by running an operating system. The CPU 20 reads a program or data from the ROM 24 or a recording medium mounted on the external storage device 42 to the main memory 22, and executes various processes. The main memory 22 serves as a temporary memory area and a work area required when the CPU 20 executes a program and an area in which various data required to execute the program are stored. The ROM 24 is a read-only storage device in which a computer program executed by the CPU 20 and data are stored.

The audio control device 26 is provided in a mobile information terminal (e.g., cell phone) with a telephone function and connected to a microphone 28 and a loudspeaker 30 to perform audio input/output control.

The nonvolatile storage device 32 is a storage device which can hold storage contents even after the power supply is turned off, and may be implemented by a hard disk drive or a semiconductor memory such as a flash memory.

The display control device 34 generates a video signal to display data, written in a frame buffer (not shown) by the CPU, on a display 36 provided in the mobile information terminal 10.

The input device 38 is a device used to let a user input a designation of an operation to the mobile information terminal 10. The input device 38 may be implemented by an arbitrary device adapted for the device such as a pointing device like a key or a track pad, various buttons, and a touch panel provided on a surface of the display 36. A mouse may be connected to the mobile information terminal through a Universal Serial Bus (USB) terminal or the like.

The communication control device 40 controls audio and data communication according to different communication schemes. A data communication scheme may be an arbitrary scheme such as a wireless Local Area Network (LAN) system like IEEE802.1b/g, infrared communication, and data communication performed by packet exchange. The mobile information terminal 10 may be connected to the network 14 by using a cable.

The external storage device 42 is a drive device using an exchangeable recording medium. The recording medium may be a magnetic disk, an optical disk, a magnetooptical disk, a semiconductor memory, or the like.

The GPS receiver 44 is a device which measures the position of the mobile information terminal based on a radio wave from an artificial satellite.

Since the constituent elements described above are known, further detailed descriptions of the elements will not be repeated.

Figure 3:
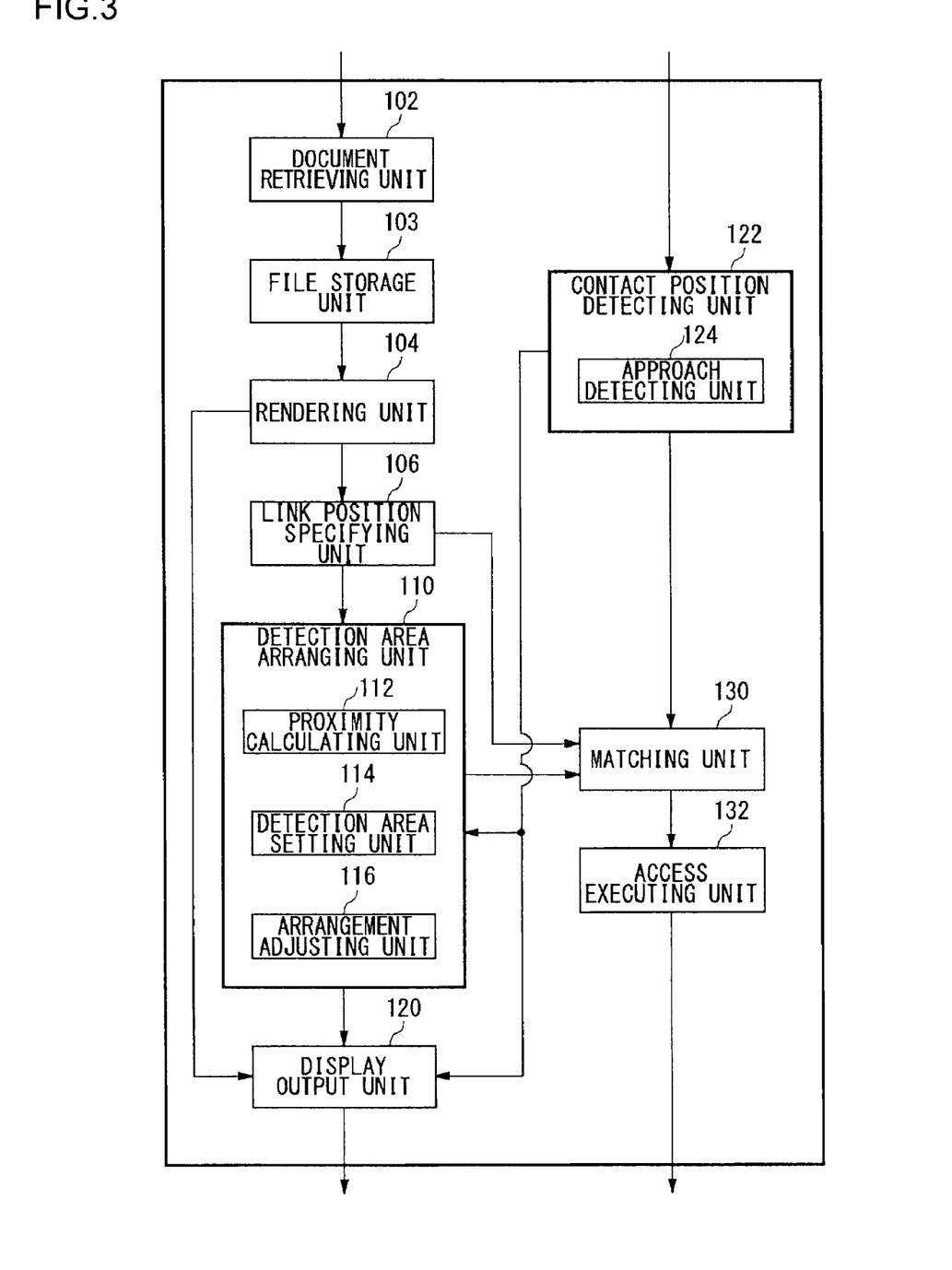
FIG. 3 shows the configuration of those parts of the portable information terminal related to the embodiment of the present invention.

FIG. 3 shows the configuration of those parts of the portable information terminal 10 related to the object detection area display function according to the embodiment. This configuration is realized by a CPU, a memory, and another LSI in an arbitrary computer in hardware, or realized in software by the coordination of browser, operating system, JavaScript, Application Programming Interface (API), etc. Of those functions implemented by the combination, FIG. 3 illustrates only those which pertain to this embodiment in the form of functional blocks. Those functions provided in a common portable information terminal are of course provided even if they are not shown in FIG. 3.

Operations and configurations of the functional blocks will be described below in detail.

A document retrieving unit 102 receives a document file for a web page via a network in accordance with the user operation such as an input of URL via a browser, the selection of a search result at a search site, or the selection of a short cut file. The document file is described in a markup language such as the Standard Generalized Markup Language (SGML), the HyperText Markup Language (HTML), the eXtensible Markup Language (XML), or the like. The document file may include a script language such as JavaScript.

A file storage 103 stores a document file retrieved by the document retrieving unit 102. If there is an external style sheet such as a Cascading Style Sheet (CSS) defining the document content to be displayed, or an external script such as EcmaScript, the file storage 103 stores the sheet or the script as well.

A rendering unit 104 displays on the display 36 the document file stored in the file storage 103 and containing a hyperlink. More specifically, the rendering unit 104 interprets the logical structure of the document file, produces the layout of the document file using information like the format of representation, table, frame, image data, form components, line breaks in a text, size of a display screen, etc. that are defined by the tags. The unit 104 displays the document in the layout thus produced. The layout process is well known to a skilled person in the form of a rendering engine so that the detailed description thereof will not be repeated.

A link position specifying unit 106 refers to the layout determined by the rendering unit 104 and specifies the position of hyperlinks in the screen.

The position of hyperlinks may be specified by a variety of methods. For example, the coordinates of the center of the character string forming the hyperlink may be specified as the position of the link. Alternatively, the coordinates of the top left corner and the bottom right corner of the rectangular area occupied by the hyperlink character string in the screen may be specified as the positions of the link. The rectangular area may alternatively defined as an area where the cursor on the screen changes as the cursor passes over the hyperlink (e.g., from an arrow to the shape of a hand) to indicate that the area is selectable. Where the character string of a hyperlink occupies multiples lines, the coordinates of the top left corner and the bottom right corner of all character strings may be specified as the positions of the link. Alternatively, the coordinates of the barycenter may be used. When the hyperlink is embedded in an object such as an image, the position is specified similarly.

A detection area arranging unit 110 includes a proximity calculating unit 112, a detection area setting unit 114, and an arrangement adjusting unit 116.

The detected area setting unit 114 sets, for each hyperlink in the document file, an object detection area for determination that the link is selected by the user as a result of contact with the controlling object associated one-to-one with the hyperlink displayed on the screen. The object detection area occupies a range different from that of the hyperlink associated therewith.

Accordingly, the object detection area is superposed on the hyperlink when the position of the hyperlink displayed on the screen in the layout has been specified. Accordingly, the mode of display of the hyperlink itself remains substantially unchanged with or without the setting of an object detection area. Further, the content of the document file is not modified.

The detection area setting unit 114 may set an object detection area for all hyperlinks found in a document file. However, if there is a sufficient space between hyperlinks and it is unlikely that a hyperlink is selected by mistake, there is no need to set an object detection area. Thus, the detection area setting unit 114 may set object detection areas in association with only those hyperlinks located close together. Determination as to whether hyperlinks are close together is made based on the proximity of hyperlinks.

The proximity calculating unit 112 calculates the proximity indicating the distance between hyperlinks located by the rendering unit 104 on the screen. The distance between the centers of two adjacent hyperlinks may be defined as proximity. Alternatively, the distance between the pair of closest corners of the rectangular areas occupied by the two adjacent hyperlinks respectively may be defined as proximity. If three or more hyperlinks are found close together, the proximity is calculated between each pair of adjacent hyperlinks. If the proximity is smaller than a predefined value, the detection area setting unit 114 determines that the links are close together.

The detection area setting unit 114 may adjust the position of object inspection areas so that a predefined minimum distance is secured between object inspection areas. This is to prevent both areas from being pressed and also prevent one of the areas from being pressed by mistake, as the user selects an object detection area using a controlling object. The minimum distance is preferably set at a value whereby simultaneous selection of multiple object detection areas by a controlling object is avoided. More specifically, a value exceeding the size of the fingertip of an average user may be defined as the minimum distance. Alternatively, a value for five characters displayed on the display may be defined as the minimum distance. An optimum value of the minimum distance may experimentally be defined using actual portable information terminals.

Alternatively, the detection area setting unit 114 may set a range occupied by an object detection area depending on the width of the rectangular area occupied by the character string of the hyperlink for which the object detection area is set. For example, given that the vertical width of the rectangular area occupied by the character string of a hyperlink is denoted by "W", the object detection area may be defined as a circle having a diameter of "aW", where "a" denotes a positive number. In this way, an object detection area occupying a relatively small range is set for a hyperlink with a small character size defined in points. For a hyperlink having a large character size, an object detection area occupying a relatively large range is set.

The arrangement adjusting unit 116 adjusts the arrangement of object detection areas under the condition that at least a part of the object detection area overlaps the associated hyperlink. As an example, the arrangement adjusting unit 116 adjusts the arrangement of object detection areas so that the distance between the object detection areas is optimized according to a certain criterion.

A display output unit 120 receives information on the object detection area set by the detection area setting unit 114. Further, the unit 120 refers to the position of the hyperlink specified by the link position specifying unit 106. The unit 120 displays the object detection area in a predefined viewable display mode, superposing the area over the associated hyperlink. By superposing the object detection area over the associated hyperlink, the user can readily recognize that the object detection area is associated with the hyperlink As described later, the display mode of the object detection area can be varied depending on various conditions.

A contact position detecting unit 122 receives an output from the touch panel 50 and detects the position on the panel touched by the controlling object. An approach detecting unit 124 uses an infrared sensor, etc. to detect the approach of the controlling object toward the touch panel 50, the range of detection by the sensor being defined in the neighborhood of the touch panel 50. The approach detecting unit 124 may not be provided.

A matching unit 130 matches the position touched by the controlling object detected by the contact position detecting unit 122 against the range occupied by the object detection area, so as to determine which object detection area is selected by the controlling object. The unit 130 transmits the information on the hyperlink associated with the selected controlling object to an access executing unit 132. Therefore, the matching unit 130 disregards the contact of the controlling object with a part of the hyperlink displayed on the screen not overlapping the associated object detection area. It is preferable that the matching unit 130 determine that the selection is confirmed when the controlling object touching the panel is removed from the panel.

The access executing unit 132 receives the information on the selected hyperlink from the matching unit 130 and requests the server to transmit a document file identified by the hyperlink. If the hyperlink is not a hyper-hyperlink and is a shortcut or a file icon, the access executing unit 132 accesses the hardware resource identified by the hyperlink to execute the access to the associated file. Since the hyperlink is normally associated with a URL designating the location of information resource found on the Internet, the unit 132 accesses the server using the URL. The term "URL" as used in this specification refers to a character string comprising a server name, port number, folder name, file name, etc., or an Internet Protocol (IP) address-based designation].

The object detection area may not necessarily be displayed in a visible mode and may be substantially transparent. This will make the user unaware of the special process of setting an object detection area. In this case, the user cannot visually know where in the hyperlink should be pressed for selection. Given that the finger is used to select a link, however, the user is prevented from recognizing that a different hyperlink is selected, by arranging object detection areas at a distance from each other where hyperlinks are close together. Further, the range occupied by an object detection area may not necessarily be larger in size than the hyperlink. A small area can still be used effectively. Therefore, in actual implementation, it is desirable that the range occupied by an object detection area be adjusted according to the display size of the portable information terminal, the size in points of characters displayed in the browser, and the level of congestion of hyperlinks in a document displayed.

Figure 4:
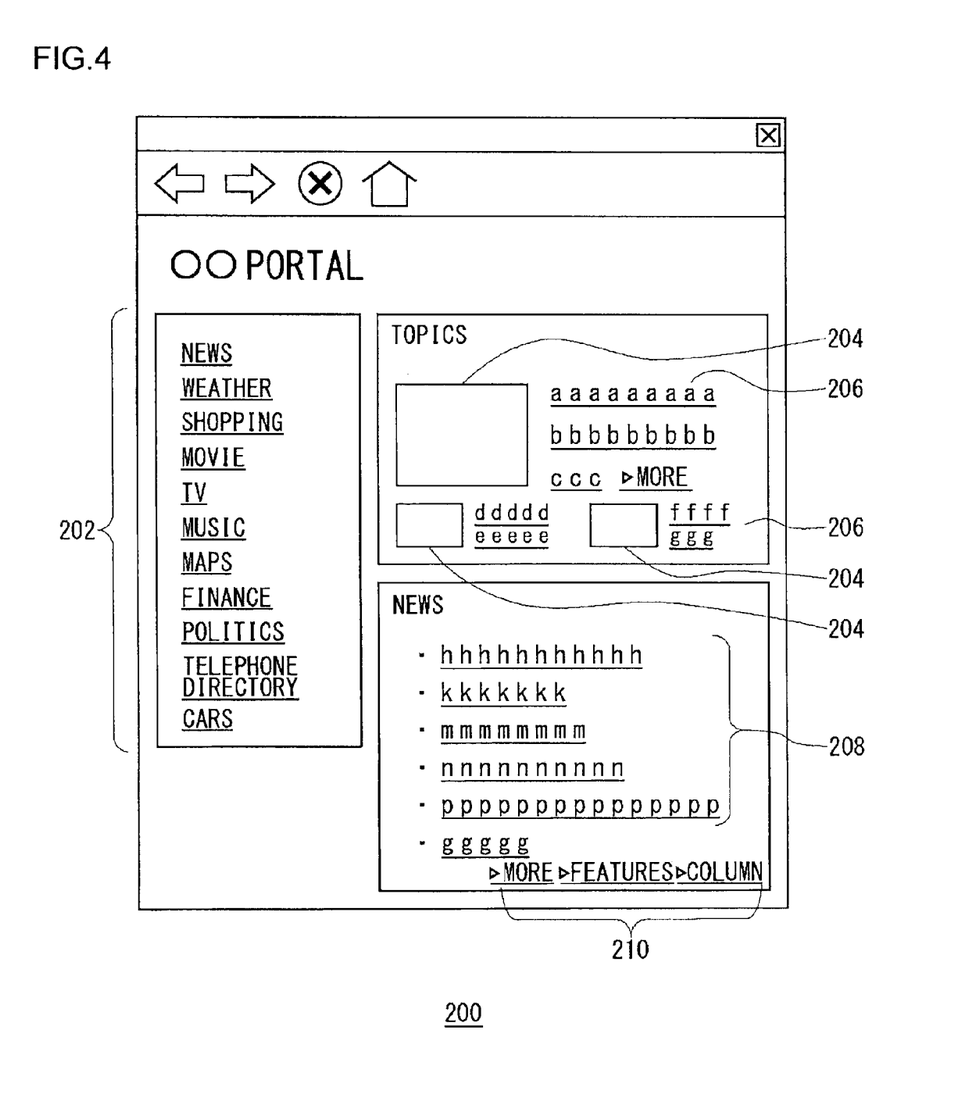
FIG. 4 shows a web page displayed on the portable information terminal.

FIG. 4 shows an exemplary screen 200 showing a document file displayed in the portable information terminal 10. As shown, the document file is a home page of a portal site and includes multiple hyperlinks. Multiple hyperlinks indicating categories are displayed in an area 202. Multiple images 204, character strings 206, 208, and 210 are also hyperlinks.

Figure 5:
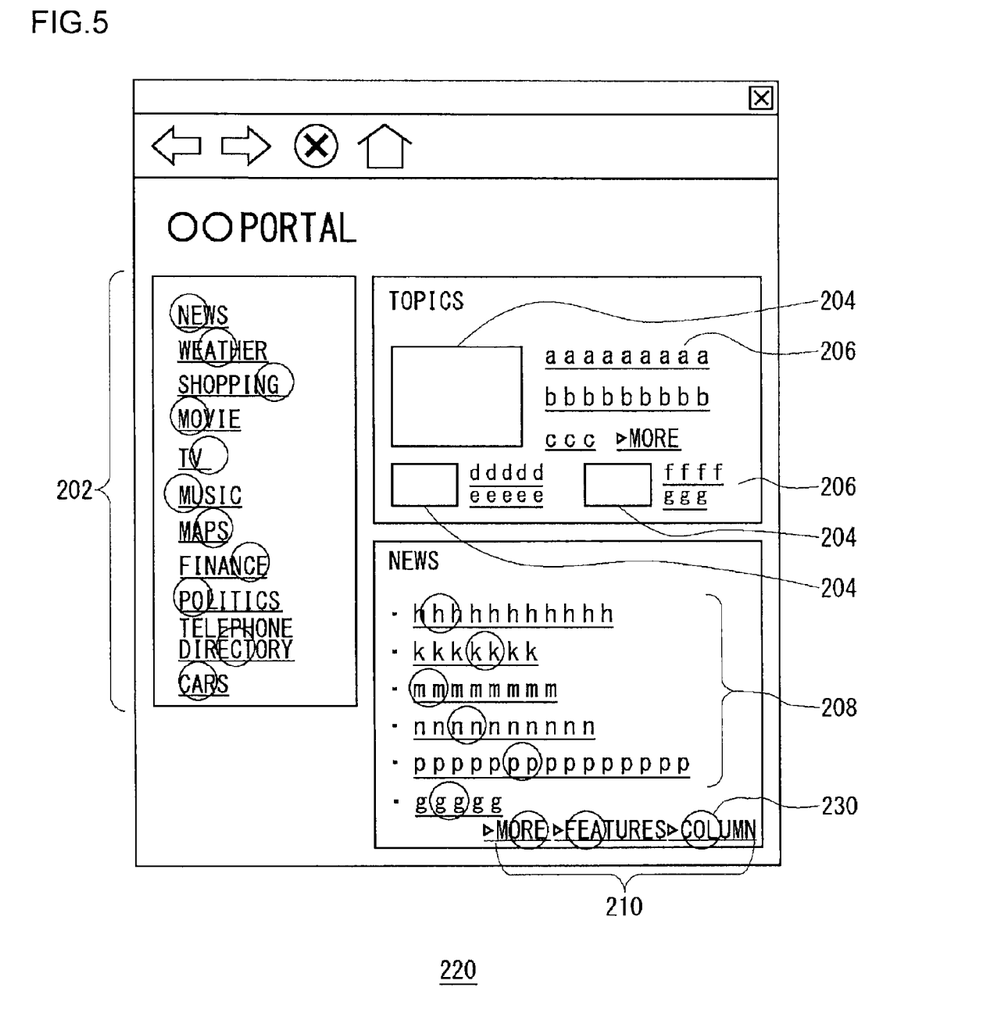
FIG. 5 shows how object detection areas are set in the web page of FIG. 4.

FIG. 5 shows a screen 220 where object detection areas are set for hyperlinks included in the document file according to the embodiment. As shown, substantially circular object detection areas 230 are set for the hyperlinks included in the area 202 and for the hyperlink character strings 208 and 210. The areas are visibly displayed, superposed on the hyperlinks. Referring to FIG. 5, object detection areas 230 are not set for the hyperlinks of the image 204 and the character string 206. This is because the detection area setting unit 114 has determined that these hyperlinks are not close together and that there is no need for object detection areas.

As mentioned before, the object detection area is displayed superposed on a part of the hyperlink. Further, it is preferable that adjacent object detection areas be easily distinguished from each other and that the boundary be clear. It is preferable, therefore, that the object detection area be substantially circular in shape, as shown in the figure. However, the object detection area may be, for example, rectangular in shape, and not all object detection areas be analogous in shape.

As described above, the associated link is determined to be selected only when the controlling object touches the object detection area. Even when the controlling object touches a part of the hyperlink not overlapping the object detection area, the link is not determined to be selected and no action is generated. Thus, by arranging object detection areas at a distance from each other as shown in FIG. 5, the user can avoid touching a different hyperlink by mistake and being connected to an undesired link destination.

Figure 6A:
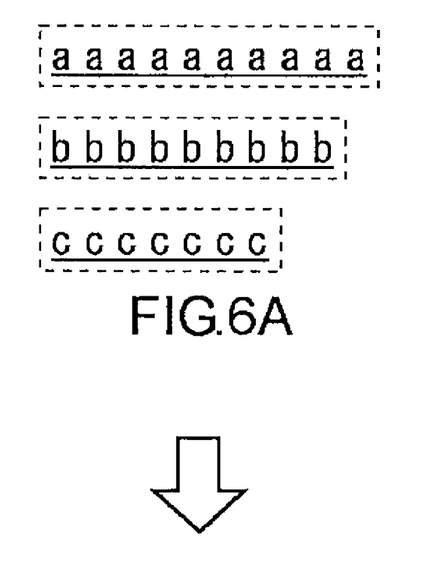
FIG. 6 shows how object detection areas are arranged.
Figure 6B:
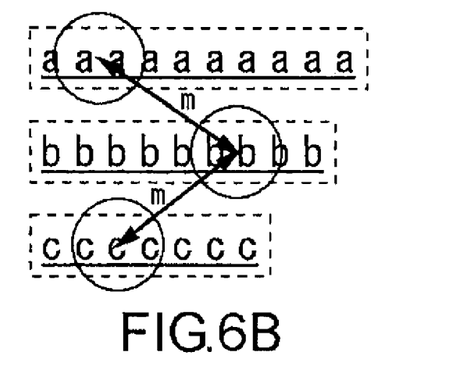
Figure 6C:
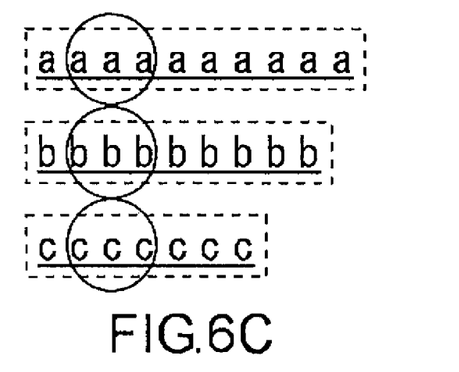

FIG. 6 shows how object detection areas are arranged. In case of a vertical array of character hyperlinks as shown in FIG. 6A, mistaken selection by a controlling object would still occur if the object detection areas are arranged vertically as shown in FIG. 6C. Therefore, the detection area setting unit 114 arranges the object detection areas, displacing them in the horizontal direction, as shown in FIG. 6B. In this case, the areas are arranged so that the distance "m" between the centers of the object detection areas is equal to or greater than a predefined minimum distance.

In addition, the arrangement adjusting unit 116 may adjust the arrangement so that the distance between the object detection areas is optimized according to a predefined criterion. For example, a well-known spring model may be formed in which the object detection area is defined as a node and the distance between the areas is defined as a spring, and the arrangement of the object detection areas is adjusted so that the energy of the spring model is minimized.

Figure 7:
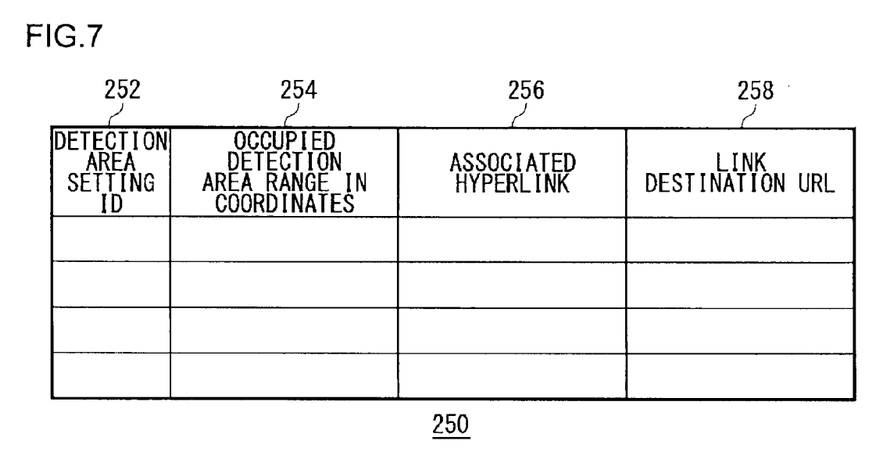
FIG. 7 shows an example of a table referred to when the position touched by the controlling object is matched against the associated link.

FIG. 7 shows an example of a table 250 referred to when the matching unit 130 matches the position touched by the controlling object against the range occupied by the object detection area. The table 250 includes a detection area setting ID 252 appropriately assigned to every object detection area established, information 254 indicating the range occupied by each object detection area, a hyperlink 256 associated with the object detection area, and a URL 258 of the destination of link. The range occupied by the object detection area may be defined in a variety manners depending on how the object detection area is set. For example, if the object detection area is circular in shape, the range may be defined by the coordinates of the center and the radius. If the area is rectangular in shape, the range may be defined by the coordinates at the left and right corners.

Upon receipt of the position touched by the controlling object from the contact position detecting unit 122, the matching unit 130 determines, by matching, whether the position is included in any of the occupied detection area ranges listed in the column 254. When the object detection area including the position of contact is found, the unit 130 outputs the corresponding detection area setting ID to the display output unit 120 and communicates the associated link destination URL to the access executing unit 132.

A description above concerns an example where the object detection area is displayed in a visible mode at the outset. Alternatively, the object detection area may not be displayed initially and is displayed when the controlling object approaches the touch panel 50. The mode will be described with reference to FIGS. 8A-8C.

Figure 8A:
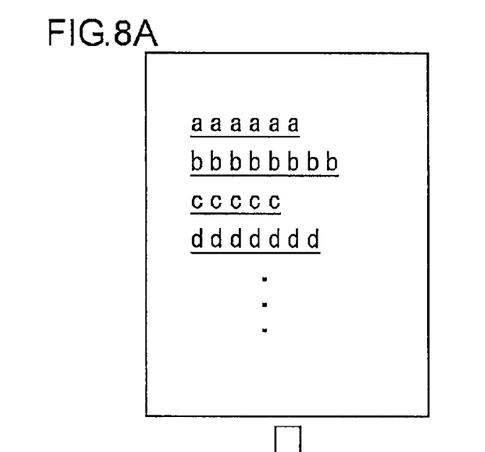
FIGS. 8A-8C show how the mode of displaying the object detection area is changed as the controlling object touches the touch panel.
Figure 8B:
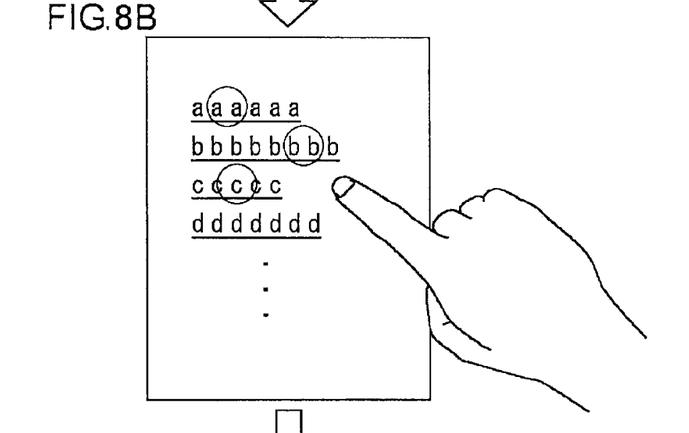
Figure 8C:
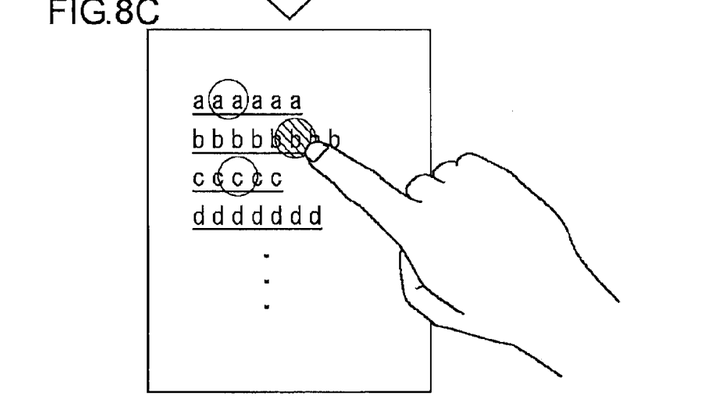

FIGS. 8A-8C show how the mode of displaying the object detection area is changed as the controlling object touches the touch panel.

As shown in FIG. 8A, even when a document file includes hyperlinks and object detection areas are set for the hyperlinks, the display output unit 120 does not display the object detection areas in a visible mode initially.

When the user approaches the finger (i.e., controlling object) toward the touch panel 50 as shown in FIG. 8B, the approach detecting unit 124 specifies the coordinates of the controlling object when the distance from the touch panel is a predefined distance or smaller. The coordinate information is transmitted to the display output unit 120. The display output unit 120 specifies the object detection area set at a predefined distance from the coordinates of the approaching controlling object (e.g., located within a circle centered at the coordinates of the approaching object and having a radius encompassing three lines of hyperlink character strings displayed in the screen). The unit 120 displays the area thus specified in a visible mode.

When the controlling object touches the touch panel as shown in FIG. 8C, the display output unit 120 renders the object detection area at the position of contact in a mode different from that of FIG. 8B. By way of example, the color of the object detection area will be changed or deepened. Alternatively, the range occupied by the object detection area is enlarged. By displaying the object detection area in a visible mode when the controlling object is detected as approaching, the user can easily know whether the desired hyperlink is correctly selected.

When the user removes the finger (controlling object) from the touch panel 50, i.e., when the approach detecting unit 124 no longer detects the controlling object, the display output unit 120 may return the object detection area to a non-displayable state.

In an alternative embodiment, the display mode of the object detection area may be changed according to the pressure of contact of the controlling object with the touch panel. In one example, the display output unit 120 may change the color of the object detection area when the controlling object barely touches the touch panel and when the controlling object is pressed with a predefined pressure or larger.

Figure 9:
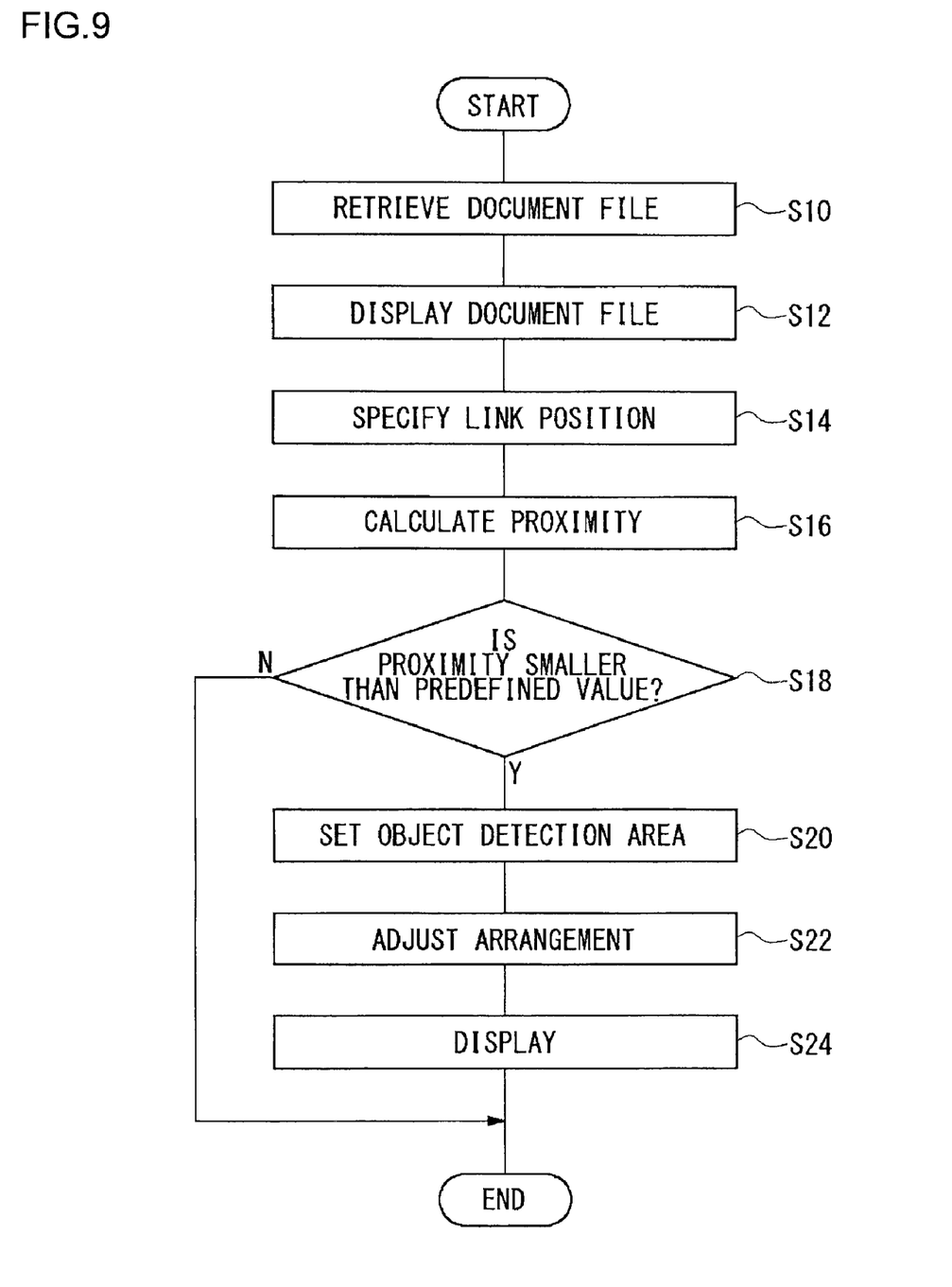
FIG. 9 is a flowchart of a process for displaying an object detection area according to the embodiment.

FIG. 9 is a flowchart for a process of displaying an object detection area according to the embodiment.

First, the document retrieving unit 102 acquires a document file and stores the file in the file storage 103 (S10). The rendering unit 104 analyzes the document file and displays the file on the display (S12). The link position specifying unit 106 specifies the position of a hyperlink displayed in the screen, by referring to the layout (S14). The detection area setting unit 114 calculates the proximity between hyperlinks (S16). When the proximity is smaller than a predefined value (Y in S18), the unit 114 sets an object detection area (S20). The arrangement adjusting unit 116 adjusts the arrangement of object detection areas so that the distance between the areas is optimized (S22). The display output unit 120 visibly displays in the screen the object detection areas thus set (S24).

Figure 10:
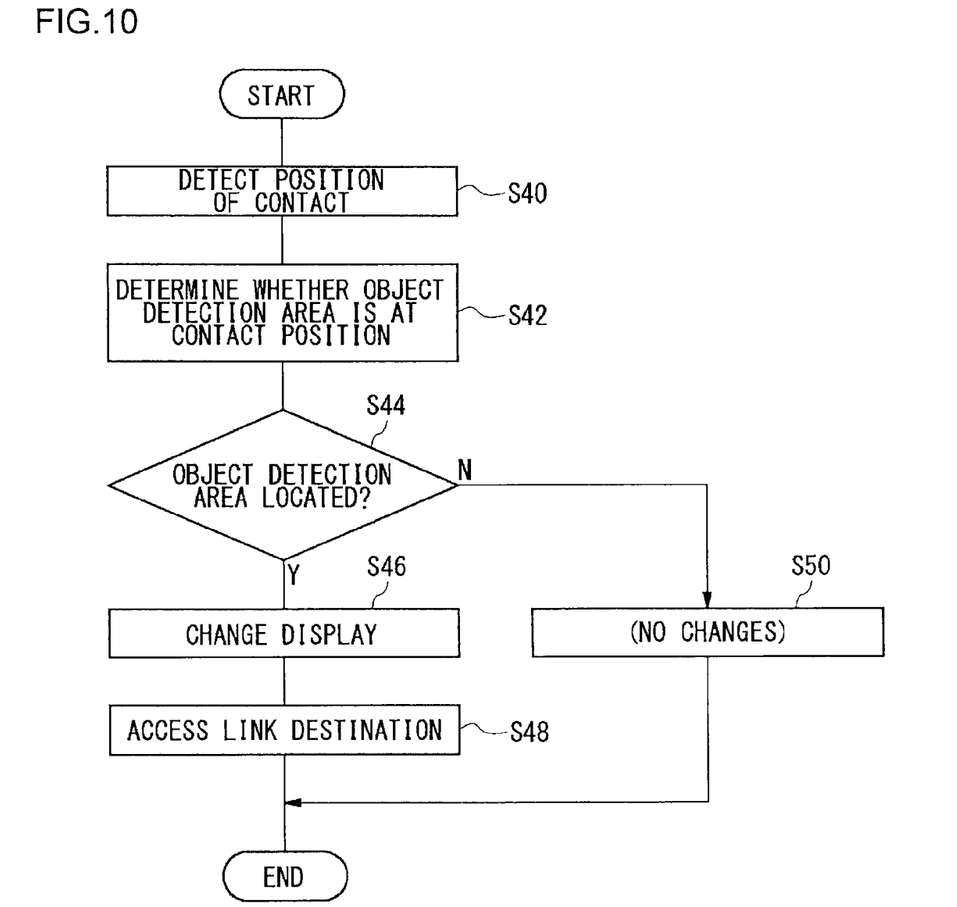
FIG. 10 is a flowchart of a process performed after a controlling object touches an object detection area.

FIG. 10 is a flowchart for a process performed after a controlling object touches an object detection area.

The contact position detecting unit 122 detects the position on the touch panel 50 touched by the controlling object (S40). The matching unit 130 matches the position touched by the controlling object against the ranges occupied by the object detection areas and determines whether the position is included in any of the ranges (S42). If the position of contact is included in the occupied range of any object detection area (Y in S44), the display output unit 120 changes the display mode of that detection area so as to let the user know that the area is selected (S46). In addition, the access executing unit 132 connects to the destination of the hyperlink associated with the object detection area (S48). If the position of contact is not included in the occupied range of any object detection area (N in S44), no action is generated (S50).

As described above, by displaying an object detection area occupying a range different from that of a hyperlink, superposing the area over the hyperlink, the ease of selecting the hyperlink is improved without changing the layout of the document file including the hyperlink. Accordingly, the operability of a portable information terminal provided with a touch panel is improved.

The object detection area according to the embodiment extends beyond the outer edge of the hyperlink. The embodiment is also unique in that a non-detection part, where the controlling object is not detected, is provided. This allows adjacent object detection areas to be spaced part from each other. For example, even where a succession of hyperlinks are arranged vertically, the embodiment makes it possible to arrange the associated object detection areas in the screen such that the centers of the areas are spread out in the horizontal direction. Therefore, an object detection area adjacent to the desired one is prevented from being recognized in error, even if a controlling object with a relatively wide end (e.g., a finger) is used to select the object detection area. The embodiment also facilitates the selection of an object detection area using a controlling object having a relatively narrow end (e.g., a stylus), because no delicate fingertip control is required.

Since the embodiment allows an object detection area occupying a range different from that of a hyperlink included in a document file to be displayed superposed on the hyperlink, no steps are required to modify the document file or to convert the document file into a special-purpose file format.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment, the object detection area is described as being displayed superposed on the hyperlink. However, the object detection area may be displayed at a distance from the associated hyperlink. For example, if hyperlinks are excessively close together, the ease of pressing a link might be improved only to a limited degree even if an object detection area is displayed. In this case, any of the object detection areas may be moved to and displayed in a blank area in the screen so as to improve the ease of selection.

A description has been given above of changing the color or size of the object detection area. Alternatively, the object detection area may be displayed to periodically change its color or may be displayed as if in motion (e.g., in rotation, flashing, vibrated, etc.). The display output unit may render adjacent object detection areas in different display modes. Further, the display output unit may change the display mode of an object detection area according to the distance to an adjacent object detection area.

The display mode of the object detection area may be associated with the number of times that the hyperlink is clicked in the portable information terminal. For example, the object detection area set for the hyperlink clicked a predefined number of times or more may be displayed with a color or size different from that of the other areas.

The object detection area may be displayed as a gradation with the color at the center being deepest. Alternatively, the object detection area may be displayed like a lens so that the characters of the hyperlink below looks distorted or magnified.

In the embodiment, the object detection area is described as being superposed on the hyperlink included in the document file. However, the invention is not only directed to hyperlinks but also encompasses anything (shortcut, alias, icon, button, etc.) that prompts the start of an associated process when the user touches a specified area therein as displayed in the screen with a controlling object. By superposing the object detection area on the link when the selectable links are close together, it becomes easier for the controlling object to touch the area.

The user may be allowed to selectively set or remove an object detection area.

In this embodiment, the object detection area display function according to the present invention is described as being implemented in a portable information terminal such as a cell phone, a PDA, a car navigation device, etc. The inventive function may of course be implemented in desktop hardware such as a desktop PC. Application of the present invention to these types of hardware, characterized by a relatively large screen size, is expected to provide benefits for those who are not good at refined control.

INDUSTRIAL APPLICABILITY

According to the present invention, the ease of selecting a link in a terminal provided with a touch panel is improved without chanting the display mode of the document file including the link.

The invention claimed is:

1. A portable information terminal comprising:
a document file acquiring unit configured to acquire a document file including a plurality of Links;
a rendering unit configured to determine a layout of the document file;
a display unit configured to display the document file in accordance with the determined layout;
a touch panel provided over the display unit configured to detect a position touched by a controlling object;
a detection area setting unit configured to set an object detection area in association with each link of the plurality of links;
a matching unit configured to match the position detected by the touch panel against the object detection area so as to determine which object detection area is selected; and
an access executing unit configured to access a resource identified by the link associated with the selected object detection area,
wherein the object detection area is different than an area in which the associated link is displayed, and
wherein the object detection area is arranged to be at least partially superposed on the area in which the associated link is displayed and to be spaced apart from an adjacent object detection area by a predefined minimum distance, without modifying the layout of the document file.

2. The portable information terminal according to claim 1, wherein
the detection area setting unit is configured to define the minimum distance so that simultaneous selection of object detection areas by the controlling object is avoided.

3. The portable information terminal according to claim 1, wherein
the display unit is configured to render the object detection area in a mode visible to the user.

4. The portable information terminal according to claim 3, wherein
the touch panel includes an approach detecting unit configured to detect an approach of the controlling object to the touch panel, and
the display unit does not render the object detection area initially, and renders the object detection area when the approach detecting unit detects the approach of the controlling object.

5. The portable infoimation terminal according to claim 3, wherein
the touch panel includes an approach detecting unit configured to detect an approach of the controlling object to the touch panel, and
the display unit changes the display mode of the object detection area when the approach detecting unit detects the approach of the controlling object.

6. The portable information terminal according to claim 3, further comprising:
a proximity calculating unit configured to calculate proximity between links placed by the rendering unit, wherein
the detection area setting unit sets the object detection area in association with the link when the proximity is smaller than a predefined value for determination that the links are close together.

7. The portable information terminal according to claim 3, wherein
the matching unit disregards the contact of the controlling object with the touch panel in a part of the link not overlapping the object detection area.

8. The portable infoimation terminal according to claim 7, further comprising:
an arrangement adjusting unit configured to adjust the arrangement of object detection areas so that the distance between the object detection areas is optimized according to a certain criterion on the condition that at least a part of each object detection area overlaps the associated link.

9. The portable information terminal according to claim 3, wherein
the detection area setting unit sets the size of each object detection area according to the size occupied by the outer edges of the character string of the link associated with the object detection area.

10. The portable information terminal according to claim 3, wherein
the display unit renders adjacent object detection areas in different display modes.

11. The portable information terminal according to claim 3, wherein
the display unit changes the display mode of the object detection area according to the distance from an adjacent object detection area.

12. The portable information terminal according to claim 1, wherein
the detection area setting unit sets a substantially circular object detection area.

13. A computer program embedded in a recoding medium and operated on a portable information terminal provided with a touch panel provided over a display, the program comprising:
a document file acquiring module configured to acquire a document file including a plurality of links;
a rendering module configured to determine a layout of the document file;
a display module configured to display the document file in accordance with the determined layout;
a contact position detecting module configured to detect a position on the touch panel touched by a controlling object;
a detection area setting module configured to set an object detection area in association with each link of the plurality of links;
a matching module configured to match the position detected by the contact position detecting module against the object detection area so as to determine which object detection area is selected; and
an access executing module configured to access a resource identified by the link associated with the selected object detection area,
wherein the object detection area is different than an area in which the associated link is displayed, and
wherein the object detection area is arranged to be at least partially superposed on the area in which the associated link is displayed and to be spaced apart from an adjacent object detection area by a predefined minimum distance, without modifying the layout of the document file.

14. The computer program embedded in a recording medium according to claim 13, wherein
the detection area setting module is configured to define the minimum distance so that simultaneous selection of object detection areas by the controlling object is avoided.

15. The computer program embedded in a recording medium according to claim 13, wherein
the display module is configured to render the object detection area in a mode visible to the user.

16. The computer program embedded in a recording medium according to claim 15, wherein
the contact position detecting module includes an approach detecting module configured to detect an approach of the controlling object to the touch panel, and
the display module does not render the object detection area initially, and renders the object detection area when the approach detecting module detects the approach of the controlling object.

17. The computer program embedded in a recording medium according to claim 15, wherein
the contact position detecting module includes an approach detecting module configured to detect an approach of the controlling object to the touch panel, and
the display module changes the display mode of the object detection area when the approach detecting module detects the approach of the controlling object.

18. The computer program embedded in a recording medium according to claim 15, further comprising:
a proximity calculating module configured to calculate proximity between links placed by the rendering module, wherein
the detection area setting module sets the object detection area in association with the link when the proximity is smaller than a predefined value for determination that the links are close together.

19. The computer program embedded in a recording medium according to claim 15, wherein
the matching module disregards the contact of the controlling object with the touch panel in a part of the link not overlapping the object detection area.

20. The computer program embedded in a recording medium according to claim 19, further comprising:
an arrangement adjusting module configured to adjust the arrangement of object detection areas so that the distance between the object detection areas is optimized according to a certain criterion on the condition that at least a part of each object detection area overlaps the associated link.

21. The computer program embedded in a recording medium according to claim 15, wherein
the detection area setting module sets the size of each object detection area according to the size occupied by the outer edges of the character string of the link associated with the object detection area.

22. The computer program embedded in a recording medium according to claim 15, wherein
the display module renders adjacent object detection areas in different display modes.

23. The computer program embedded in a recording medium according to claim 15, wherein
the display module changes the display mode of the object detection area according to the distance from an adjacent object detection area.

24. The computer program embedded in a recording medium according to claim 13, wherein
the detection area setting module sets a substantially circular object detection area.

* * * * *